United States Patent [19]

Wells

[11] 4,440,494
[45] Apr. 3, 1984

[54] MICROFILM DUPLICATOR

[75] Inventor: Thomas R. Wells, Des Plaines, Ill.

[73] Assignee: Bell & Howell Company, Chicago, Ill.

[21] Appl. No.: 425,219

[22] Filed: Sep. 28, 1982

[51] Int. Cl.³ .............................................. G03B 27/30
[52] U.S. Cl. .................................... 355/100; 355/75; 355/113
[58] Field of Search ................ 355/75, 100, 102, 133, 355/113

[56] References Cited

U.S. PATENT DOCUMENTS

| | | | |
|---|---|---|---|
| 3,726,590 | 4/1973 | Kistner et al. | 355/100 |
| 3,774,520 | 11/1973 | Smith et al. | 355/100 |
| 3,775,711 | 11/1973 | Burgess et al. | 355/100 |
| 3,817,618 | 6/1974 | Riley et al. | 355/100 |
| 3,836,252 | 9/1974 | Touchette et al. | 355/100 |
| 4,082,439 | 4/1978 | Seitz | 355/100 |
| 4,147,429 | 4/1979 | Lysle | 355/113 X |
| 4,281,922 | 8/1981 | Matsumoto | 355/100 X |

*Primary Examiner*—Richard A. Wintercorn
*Attorney, Agent, or Firm*—Neal C. Johnson; Alan H. Haggard; Alan B. Samlan

[57] ABSTRACT

A microfilm duplicator for duplicating images received from a microfiche onto a duplicating medium. Images from the master microfiche are transferred to the duplicating medium at an exposure station. A duplicating medium support frame is operator moveable to cause the duplicating medium to be transported to a developing station wherein the duplicating medium is developed. The duplicating medium is then transported to a clearing station wherein unimaged areas are cleared from the duplicating medium and the duplicate is discharged at a discharge station. While one duplicate is being developed, a second duplicate can be exposed at the exposure station thus increasing throughput of the device.

18 Claims, 4 Drawing Figures

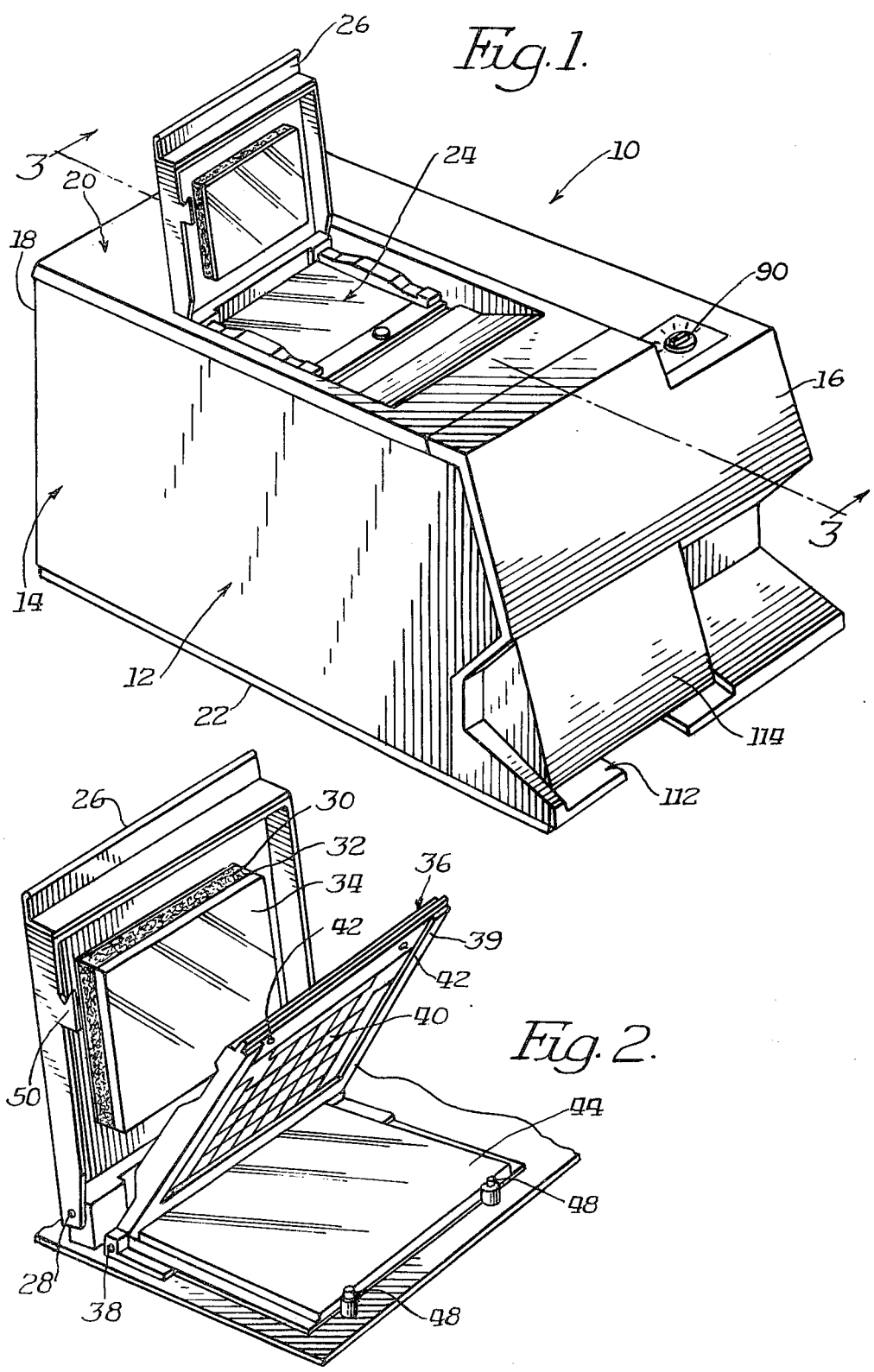

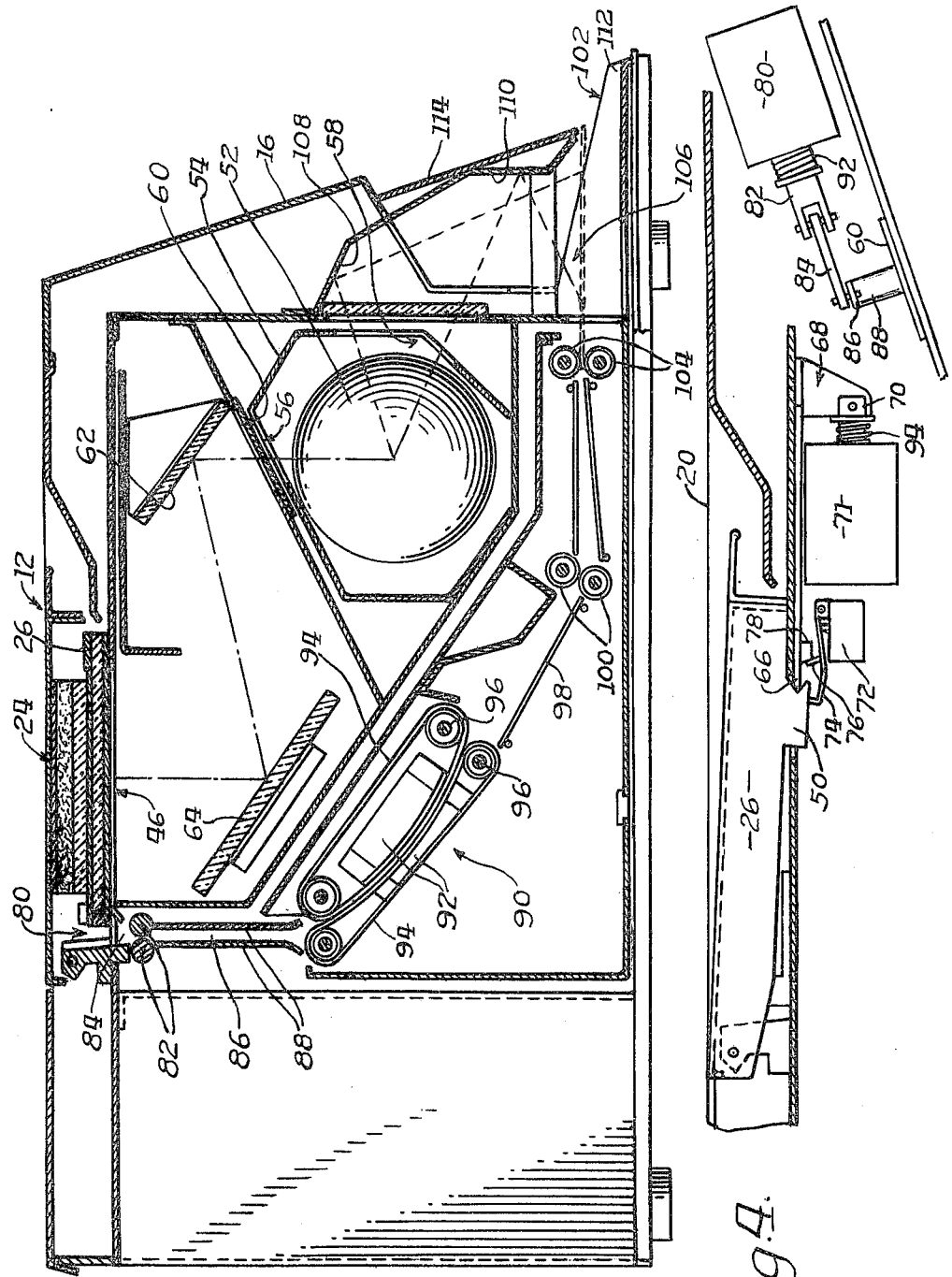
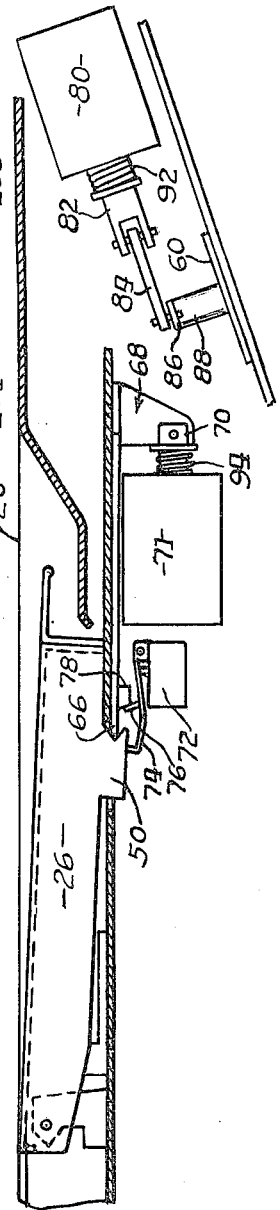
Fig. 3.
Fig. 4.

MICROFILM DUPLICATOR

BACKGROUND OF THE INVENTION

This invention relates to microfilm equipment and more particularly to an improvement in microfilm duplicators which make duplicates of individual microfilm cards or microfiche.

Microfilm has become a common medium for compactly storing large amounts of information. Two types of microfilm storage are commonly used. A first is the roll film type of storage in which the images are placed on a continuous roll of microfilm usually one hundred feet long. When retrieval of a particular image is desired, the film is transported through suitable reading means until the desired image is located. A second type of storage of images on microfilm is commonly referred to as microfiche. This is commonly a four inch by six inch clear plastic envelope, or jacket, having several channels. Within the channels are placed individual strips of microfilm which contain the previously recorded images. The jacket provides a protective covering for the microfilm contained in the channels. In this format, the jacket is commonly referred to as a "master" from which duplicates are made for distribution and use. In this manner, the "master" can be maintained in a secured file which duplicates are circulated for use. Also, the "master" is not designed for constant handling and use. It can be damaged when left in one position on a microfilm reader due to overheating caused by the light passing through one image on the film. Thus it is preferable to work with a more rugged medium which has the same recorded images.

Another form of microfilm master has the images recorded in the form of relief or deformation images. The master is generally a photoplastic film which is heat deformable so as to allow for recording of deformation images. One such product presently available using photoplastic masters is sold by the assignee of the present invention under the trademark Microx. In order to simplify the discussion herein, the term "microfiche" will be used throughout to refer to jackets or microfilm masters regardless of their form.

Traditionally, duplicates of the microfiche have been made by projection of the images through lenses or by contact duplication. Duplication through use of an optical system may not be preferred, in part, because lenses are expensive and because of the space normally required to accommodate the light path. Contact duplicating from a photoplastic master may yield duplicates of inferior quality. It has been found that one can produce acceptable duplicates from such a master by projecting light from the master through a small gap onto the duplicate film. One such method is disclosed in U.S. Pat. No. 3,809,473 entitled "Method of Reproducing a Relief Image," although apparatus to implement the process is not described.

Additional apparatus for making duplicates is illustrated in U.S. Pat. No. 4,147,429 entitled "Apparatus and Process for Photographically Duplicating Intelligence Existing on Photoplastic Film." This patent goes into great detail in describing the calculation of the gap distance between the master and duplicate and illustrates apparatus to expose the duplicate to the images on the master. However, there is not illustrated any apparatus to further develop the duplicate after exposure to the master.

Contact printing or duplicating is common when the master microfiche has silver based film. Numerous contact printing devices are presently available for microfilm, but some of them are designed to only expose the duplicate creating a latent image thereon and require additional apparatus to develope the duplicate.

The duplicating media is normally hand transferred to additional processing equipment to develop the latent image and clear the portion of the duplicating media which was not imaged. Such additional processing equipment can be of various types depending upon the type of duplicating medium used.

For example, if a vesicular duplicating medium is used, the duplicating medium is first exposed to the microfiche under ultraviolet light. The developing station will generally include a conventional heat setting device to develop and set the previously exposed images. This may be followed by a clearing station wherein ultraviolet light clears the unimaged areas of the vesicular film.

If the duplicating medium is a diazo film, the images are formed by exposing the microfiche and diazo duplicating film to ultraviolet light. The exposed duplicate is then developed in aqueous ammonia systems or in anhydrous ammonia environments. Another type of diazo film which is available only requires heat for developing. A clearing station is not required with this medium.

The major drawbacks with the devices described above and those of the prior art, is that the duplicating medium must be manually moved from the exposure device to additional apparatus for processing. This is a major inconvenience to the operator and can result in developing errors should the exposed film be dropped, or affected by the atmosphere in moving it from the exposure to the developing device.

OBJECTS AND ADVANTAGES

Thus, it is an object of this invention to provide a unitary device which can expose and develop duplicates of microfiche.

It is a related object to provide a unitary duplicating device which will simply and efficiently transport the duplicating medium from the exposure station to the developing station. Such a device should also be capable of transporting the duplicating medium from the developing station to the output of the device with a minimum of operator interaction.

Yet another object is to provide a duplicating device which is adaptable to making duplicates of various forms of microfiche, such as silver halide or deformation image type.

Still another object is to provide a duplicating device which can expose and image a second duplicate while a previously exposed duplicate is being developed so as to increase throughput of the device.

SUMMARY

Applicant has provided a unique microfilm duplicating device which duplicates images received from a microfiche onto a duplicating medium in a unitary enclosure. The enclosure houses an exposure, developing, clearing and discharge station. An ultraviolet light source forms a latent image on the duplicating medium at the exposure station. The duplicating support means is raised and the duplicate is ejected into the developing path. Belts and rollers move the duplicating medium from the exposure station through a heat developing device at the developing station. The duplicating medium is developed and subsequently discharged at a clearing station wherein light from the light source clears the unimaged areas of the duplicating medium.

The exposure station has a hinged cover which is locked in its closed position during exposure. An automatic timing device releases the cover at the end of the exposure cycle so that the operator can cause the duplicating medium support means to be raised to drop the duplicating medium into the developing path. While the first exposed duplicate is being developed, a subsequent duplicate can be exposed.

BRIEF DESCRIPTION OF THE DRAWINGS

The objects and advantages stated above, and other objects of the invention are set forth more particularly in the following detailed description of the accompanying drawings in which:

FIG. 1 is a perspective view of the inventive unitary microfilm duplicator.

FIG. 2 is an enlarged perspective view with portions removed of the exposure station illustrating the microfiche support means and duplicating support means with the exposure station cover in the open position.

FIG. 3 is a cross sectional view taken along Line 3—3 of FIG. 1 except with the cover in the closed position.

FIG. 4 is an enlarged cross sectional view with portions removed of the laching device which maintains the cover in a locked position during exposure.

DESCRIPTION OF THE PREFERRED EMBODIMENT

Turning first to FIG. 1 there is illustrated a duplicating device 10 of the present invention. The device 10 is comprised of a housing 12 having sides 14, a front 16, a rear 18, a top 20, and bottom 22. At the top 20 is an exposure station 24 wherein the operator places the microfiche and duplicating medium. A cover 26 is hinged to the top 20 so that it can cover the microfiche and duplicating medium during exposure.

An enlarged view of the exposure station 24 is more clearly illustrated in FIG. 2. The cover 26 is affixed to the top 20 by means of a cover hinge 28. On the under side of the cover 26 is affixed a foam material 30 which has its bottom most face covered with a white paper or sheet material 32. This can also be double sided white tape which can easily adhere to the foam material 30. A glass plate 34 is then attached to the sheet or tape 32. The foam material 30 aids in providing a uniform compressive force against the duplicating medium to keep the duplicating medium in a flat plane during exposure of the microfiche and duplicating medium when the cover 26 is closed. This is necessary so that the images from the microfiche will be uniformly focused across the duplicating medium.

A duplicating medium support 36 is also attached to the top 20 by means of hinge 38. The duplicating medium support 36 has a frame 39 with a grid 40 retained on the frame 39.

At the bottom of the exposure station 24 is a glass platen 44 which covers a rectangular opening 46 in the top 20 of the housing 12. The glass platen 44 acts as a microfiche support and holds the microfiche in place during exposure. There are locating pins 48 which are accurately positioned on the top 20 to receive complementary locating holes in the microfiche.

The exposure station 24 as described above is particularly designed for use with making duplicates of photoplastic film. The film may have two different size locating holes so that the locating pins 48 will receive the master against the glass platen in only one way eliminating the possibility of reversal. The support 36 includes locating holes 42 dimensioned to be received by the locating pins 48 after the microfiche is positioned on the glass platen 44. The grid 40 acts as a spacing medium between the microfiche and the duplicating medium as is taught in the above-mentioned U.S. Pat. No. 4,147,429. The grid 40 also enables the duplicating medium to have a matrix grid separating the individual images since the photoplastic master does not include separating channels. With the microfiche in place, the frame 39 is lowered over the microfiche. The duplicating medium (not illustrated) is then placed on top of the frame 39 which accurately positions the medium. If the microfiche was not a photoplastic master, but rather of the silver halide jacket type, then the gap provided by the grid 40 is not necessary and the grid 40 can be removed. With the duplicating medium in place, the cover 26 is closed as seen in FIG. 3.

As shown in FIG. 3, within the housing 12 is a light source 52 which is a high pressure galium enhanced mercury vapor lamp. This is within a lamp housing 54 which has a projection aperture 56 and a clearing aperture 58 therein. Covering projection aperture 56 is a shutter 60 which interrupts the light path from the lamp 52 to the exposure station 24. When the shutter 60 is opened, light passes through the projection aperture 56 to a first mirror 62, is reflected to a second mirror 64 and then upward through the cut out 46 into the exposure station 24. The light will pass through the microfiche and associated duplicating medium, and cause the images on the microfiche to be imaged onto the duplicating medium.

The imaging operation is initiated and controlled by a system shown in FIG. 4. The door 26 includes a lip 50 which may be engaged by a latch 66 which is slidable into and out of engagement with the lip 50 to hold the cover closed as shown or released to an open position. The latch 66 is rigidly connected to a plate 68 which is connected to a plunger 70 of a solenoid 72, the actuation of which controls the position of the latch 66.

A switch box 72 includes switches 74 and 76 engagable by the door lip 50 and latch 66 respectively. When the door 26 is closed the lip 50 closes the switch 74 which actuates the solenoid 72. This moves the latch 66 into engagement with the lip 50 to hold the door closed.

This same movement of the latch 66 initiates opening of the shutter 60. The latch 66 includes a tab 78 which engages and closes the switch 66 which actuates a shutter-control solenoid 80. The solenoid 80 includes a plunger 82 connected through a link 84 to a crank 86. The crank 86 rotates the shutter 60 about a pivot post 88 between positions opening and closing the aperture 56 (FIG. 3).

It will thus be seen that closure of the door 26 automatically opens the shutter 60 to expose the light from the lens 52 through the master film onto the duplicating medium. The length of the exposure for optimum results is pre-selected by a control mount 90 (FIG. 1) which controls a potentiometer (not shown).

Upon completion of the preselected exposure period, a switch (not shown) is closed permitting the solenoid plunger 82 to be moved by a spring 92 to swing the shutter 62 position closing the aperture 56. After a delay of approximately one second, the door control solenoid 71 is deactuated to permit a spring 94 to move the latch 66 out of engagement with the door lip 50.

The cover 26 is then moved to the fully opened position as seen in FIG. 1. The operator lifts the duplicating medium support 36 so that it is vertically upright. The duplicating medium will then be dropped due to gravity into a throat 80 (FIG. 3). Feed rollers 82 form a nip 84 into which the duplicating medium drops and is fed into a channel 86 between channel walls 88. The channel 86 forms a developing path which leads from the exposure station 24 to a developing station 90.

The developing station 90 includes a heating device which causes development of the duplicating medium. The heating device includes a pair of opposed heater elements 92 positioned within respective endless flexible heater belts 94. Heater belt drive rollers 96 cause the flexible heater belts 94 to slowly revolve in a direction which will move the developing medium from the channel 86. The heater elements 92 cause the flexible heater belts 94 to be uniformly heated over their surfaces as the belts are moved. This is necessary so that a uniform heat is applied across the surface of the duplicating medium which provides even, uniform development. The duplicating medium is discharged onto a guide plate 98 which directs the duplicating medium into a pair of feed rollers 100 and then out toward a discharge station 102 by means of additional feed rollers 104. A discharge path is thus formed from the developing station 90 to the discharge station 102 of sufficient length to allow the duplicating medium to cool.

Adjacent to the discharge station 102 is a clearing station 106 which clears unused diazo salts from the duplicating medium. This is accomplished by permitting some ultraviolet light from the lamp 52 to pass through the aperture 58 to reflective surfaces 108,110 on the front 16 of the unit. This provides for light distribution across the duplicating medium as it enters the clearing station 106.

A receiving tray 112 catches the duplicating medium as it is ejected from the rollers 104. There is also provided a protective shield 114 at the front 16 so that the operator is shielded from the ultraviolet light as it passes through the clearing aperture 58 to the clearing station 106.

The above-described invention is particularly designed for use with vesicular duplicating medium which can be developed by heat. The ultraviolet clearing station will burn out diazonium salts in the unimaged areas. The above-described device could also be used with dry diazo duplicating films in which case the clearing station is not required.

After exposure of one piece of duplicating medium at the exposure station 24 and the ejection of the duplicating medium into the throat 80, a second piece of duplicating medium can be placed on the support 36 and the cover 26 can be closed initiating a second exposure sequence. While the second exposure is occurring, the first duplicating medium can pass through the developing path towards the developing station 90. After the second exposure sequence has been completed, the second duplicating medium can be discharged into the throat 80 and a third sequence begun. The only limitation on the throughput of the machine is the length of time required for exposure of the duplicating medium.

Thus, there has been provided a microfilm duplicating device which fully satisfies the objects, aims and advantages set forth above. It is evident that many alternatives, modifications, and variations will be apparent to those skilled in the art. Accordingly, it is intended to embrace all such variations as fall within the spirit and broad scope of the appended claims.

What is claimed is:

1. An integral unit for duplicating images received from a microfiche onto a duplicating medium comprising:
    an exposure station, a developing station and a discharge station, all housed within an integral enclosure;
    the exposure station comprising means to form a latent image on the duplicating medium by exposure of the duplicating medium to the images on the microfiche,
    microfiche support means for retaining the microfiche in a fixed microfiche plane, and
    duplicating medium support means for retaining the duplicating medium in a first position parallel to the microfiche plane during exposure of the duplicating medium;
    a developing path traversable by the duplicating medium extending from the exposure station to the developing station;
    the duplicating medium support means moveable to a second position to discharge the duplicating medium into the developing path;
    the developing station comprising means for developing the latent images on the duplicating medium;
    a discharge path traversable by the duplicating medium extending from the developing station to the discharge station;
    whereby the duplicating medium has a latent image imposed thereon from the microfiche at the exposure station, is developed at the developing station, and is outputted at the discharge station.

2. The device of claim 1 and further comprising illumination means directing light from the light source through the microfiche to cause the images on the microfiche to be directed onto the duplicating medium.

3. The device of claim 1 wherein the duplicating medium support means pivots along an edge between the first and second positions.

4. The device of claim 3 wherein the microfiche support means is horizontally disposed and the duplicating medium support means in the first position is parallel thereto during exposure, and is operator moveable to the second position after exposure.

5. The device of claim 4 wherein the second position is at an angle with respect to the first position, with the vertex of the angle being the pivot edge of the duplicating medium support means, the angle of the duplicating support means causing the duplicating medium to be dropped into the developing path.

6. The device of claim 2 and further comprising shutter means disposed between the illumination means and the exposure station, and control means operatively connected to the shutter means to control opening and closing of the shutter means.

7. The device of claim 6 and further comprising an exposure station cover allowing operator access to the exposure station for placement of the microfiche and duplicating medium by the operator in the exposure station.

8. The device of claim 7 wherein the exposure station cover is moveable between opened and closed positions, with the cover opened to insert the microfiche and duplicating medium, and closed during exposure.

9. The device of claim 8 and further comprising latching means to automatically maintain the cover in its closed position until exposure is complete, and thereafter automatically releasing the latching means.

10. The device of claim 9 wherein the latching means comprises a catch on the cover and complimentary cath engaging means which are solenoid operated to control engagement by the engaging means with the catch.

11. The device of claim 10 wherein the latching means maintains the cover in its closed position while the shutter means is opened.

12. The device of claim 1 wherein a second duplicating medium can be exposed at the exposure station while the duplicating medium with the latent image thereon is being developed.

13. The device of claim 1 wherein the developing station includes a heat developer.

14. The device of claim 13 and further including a duplicating medium clearing station located downstream from the developing station, including means disposed at the clearing station for directing a clearing light onto the developed duplicating medium.

15. The device of claim 2 wherein the duplicating medium is vesicular film and the illumination means is an ultraviolet light.

16. The device of claim 15 and further comprising duplicating medium clearing means at the discharge station wherein light from the illumination means is directed onto the developed film which removes diazonium salts from the unimaged areas.

17. The device of claim 1 and further comprising a grid structure disposed between the microfiche and the duplicating medium.

18. A microfilm duplicating device for duplicating images received from a microfiche onto a duplicating medium comprising:

a unitary enclosure with exposure, developing, clearing and discharge stations;

the exposure station including light source means for forming a latent image on the duplicating medium, microfiche support means for retaining the microfiche in a fixed microfiche plane, and duplicating medium support means for retaining the duplicating medium in a first position parallel to the microfiche plane during exposure and operator moveable to a second position after exposure;

a developing path with developing transport means traversable by the duplicating medium extending from the exposure station to the developing station to transport the duplicating medium from the exposure station to the developing station;

the duplicating medium placed in the developing path when the duplicating medium support means is moved to the second position;

the developing station comprising heat developing means for developing the latent image on the duplicating medium;

a discharge path with discharge transport means traversable by the duplicating medium extending from the developing station to the discharge station to transport the duplicating medium from the developing station to the discharge station;

the clearing station positioned downstream of the developing station comprising means for directing a clearing light onto the developed duplicating medium to clear non-imaged areas;

whereby the duplicating medium has a latent image imposed thereon from the light source and microfiche at the exposure station, is developed at the developing station, is cleared at the clearing station and is outputted at the discharge station with all processes occurring in a singular, unitary enclosure.

* * * * *